US006178374B1

(12) United States Patent
Möhlenkamp et al.

(10) Patent No.: US 6,178,374 B1
(45) Date of Patent: Jan. 23, 2001

(54) METHOD AND DEVICE FOR TRANSMITTING DATA ON TRAFFIC ASSESSMENT

(75) Inventors: Klaus Möhlenkamp; Thomas Müller, both of Düsseldorf; Werner Schulz, Meerbusch; Stefan Vieweg, Düsseldorf, all of (DE)

(73) Assignee: Mannesmann AG, Düsseldorf (DE)

( * ) Notice: Under 35 U.S.C. 154(b), the term of this patent shall be extended for 0 days.

(21) Appl. No.: 09/284,163

(22) PCT Filed: Oct. 7, 1997

(86) PCT No.: PCT/DE97/02360

§ 371 Date: Apr. 9, 1999

§ 102(e) Date: Apr. 9, 1999

(87) PCT Pub. No.: WO98/15935

PCT Pub. Date: Apr. 16, 1998

(30) Foreign Application Priority Data

Oct. 10, 1996 (DE) ............................................. 196 43 454

(51) Int. Cl.[7] ................................................... G06F 165/00

(52) U.S. Cl. .......................... 701/117; 701/118; 701/207; 701/220; 340/905; 340/989

(58) Field of Search .................................... 701/117, 116, 701/118, 119, 24, 25, 26, 209, 220; 340/905, 989, 988, 990

(56) References Cited

U.S. PATENT DOCUMENTS 5,845,227 * 12/1998 Peterson ............................... 701/209

* cited by examiner

*Primary Examiner*—William A. Cuchlinski, Jr.
*Assistant Examiner*—Arthur D. Donnelly
(74) *Attorney, Agent, or Firm*—Cohen, Pontani, Lieberman & Pavane

(57) ABSTRACT

A process for the wireless transmission of data to a traffic sensor for assessing traffic in segments of a road network includes collecting data in a plurality of floating cars that travel in traffic and have sensor system for collecting the data. A current driving profile is formed in each floating car from the collected data. Actual values of characteristic driving profile properties are derived from the current driving profile and expected values of the characteristic driving profile properties are formed based on preestablished traffic situation information. A difference between the actual values and the expected values is determined and if the difference is determined to be a serious deviation from the expected values based on preestablished decision criteria, the data collected by the sensors is transmitted to a traffic center.

18 Claims, 1 Drawing Sheet

METHOD AND DEVICE FOR TRANSMITTING DATA ON TRAFFIC ASSESSMENT

BACKGROUND OF THE INVENTION

1. Field of the Invention

The invention relates to a process for the wireless transmission of data to a traffic center for the purpose of assessing traffic in segments of a road network. The data are collected in a plurality of vehicles (floating cars) that travel in traffic and are equipped with sensor systems for data collection. The invention also relates to a device to implement this process.

2. Description of the Prior Art

Various methods are known for the metrological collection of data for traffic assessment in segments of a road network. Often, stationary or fixed sensors installed at roadside such, for example as induction loops, are used at especially critical locations to measure technical traffic variables, such as the number of vehicles passing during a given time period or the average speed of these vehicles. However, installing stationary sensors such as those disclosed in U.S. Pat. No. 5,317,311 at roadside or in the road surface is expensive, as is the maintenance of such sensors. As a rule, such sensors transmit current measurement data to a traffic center for further assessment at regular intervals.

Recently, there has been discussion and testing of processes in which data measurement for traffic assessment is conducted in the vehicles taking part in traffic. The vehicles used for this purpose are equipped with sensors. Such sensor vehicles are also called "floating cars." This concept of data collection presupposes wireless communications for data transfer between the floating cars and a traffic center. Preferably, data transfer is carried out via radio. Due to the limited capacity of the broadcast channels, such communications must, for technical as well as economic reasons, be limited, to the greatest possible extent, to the necessary minimum. Instead of constantly maintaining radio contact, a typical application of the floating car concept disclosed, for example in DE 195 13 640 simply transmits the most recent measurement data at regular intervals. These data include, in particular, the time of day, the location and speed of the vehicle and, as applicable, other measurement variables on the vehicle surroundings, e.g., fog, rain or black ice. Such a chronological chain of individual data is described hereinafter as the "driving profile."

However, this known process is not completely satisfactory. It has the disadvantage that, despite data reduction, measurement data with little informative value are frequently transmitted. The reporting behavior of each vehicle is controlled purely chronologically, for example, and is not directly influenced by the usefulness of the transmitted data for the purpose of traffic assessment. The individual floating cars report their data regardless of whether they happen to be located on a completely empty road or in heavy traffic or in a zone where traffic has been disrupted by a recent accident. Since the primary goal of data collection for traffic assessment is to detect traffic disruptions, reports of non-disrupted traffic contribute only slightly to this goal.

SUMMARY OF THE INVENTION

The object of the invention is to further develop a generic process in such a way that data transmission from floating vehicles to a traffic center is limited to the greatest possible extent largely to data with great informative value for traffic assessment. Another object of the invention is to provide a device to implement this process.

This object is attained according to the invention by a process for wireless transmission of data for traffic system assessment in segments of a road network to a traffic center, comprising the steps of collecting data using sensors in a floating vehicle in the road network, forming a current driving profile from the data, deriving actual values of characteristic driving profile properties from the current driving profile, forming expected values of characteristic driving profile properties based on preestablished traffic situation information, comparing the actual values to the expected values, assessing a difference found in said step of comparing and determining whether the difference is a serious deviation from the expected values based on preestablished decision criteria, and transmitting the actual values to the traffic center if it is determined that the difference is a serious deviation in said step of determining.

The object is also attained by a device for wireless transmission of data for traffic system assessment in segments of a road network to a traffic center, including a sensor system mounted in a floating vehicle for determining driving profile data, a processing device for receiving the driving profile data from said sensor system and determining actual values and expected values of characteristic driving profile properties, a comparator for comparing the actual values and expected values of the characteristic driving profile properties and determining a difference between said actual values and said expected values, a first memory comprising decision criteria, and a transmitting device for transmitting said driving profile data to the traffic center when said difference between said actual values and said expected values is determined to be a serious deviation from said expected values based on said decision criteria in said first memory.

By means of the process according to the invention, the transmission of redundant or irrelevant data is kept to a minimum. The starting point of the invention is the idea that data reflective of the picture of the traffic situation that already exists (or probably exists) at a traffic center are not of interest in themselves and therefore, if possible, should not be transmitted by individual data collection vehicles. This situation must be objectively recognizable in the individual vehicles, so that an appropriate decision to transmit data or to refrain from transmitting data from each vehicle can be made.

The basis of the invention is the sensor data collected in a vehicle. These sensor data are collected cyclically, for example, then stored temporarily and assessed in the vehicle. The totality of sensor data creates a "driving profile." In general terms, a driving profile is a description of driving behavior over a certain route segment or a certain time period. Simple forms of driving profiles include: speed travelled as a function of time (speed-time graph), location as a function of time (location-time graph), and speed as a function of location. Of course, other sensor data, such as turning angle, acceleration, etc. can also be used for the driving profile. A driving profile has in fact been "driven" and describes the actual behavior of the vehicle.

According to the invention, a current driving profile is created from the sensor data collected in the vehicle. Then, in the vehicle, characteristic properties in the form of actual values are derived from that current driving profile. Further, based on predetermined traffic situation information, characteristic driving profile properties in the form of expected values are also arrived at in the vehicle. In the framework of the invention, these expected values of the driving profile properties are then compared with the actual values of the driving profile properties. After this, the differences found by means of this comparison are evaluated in the vehicle on the basis of preestablished decision criteria. Based on this evaluation, collected data are transmitted to the traffic center only if required according to the decision criteria.

In the sense of the present invention, the driving profile properties serve to summarize a driving profile in the form of a few criteria or characteristic values, so that this profile can then be checked, as simply as possible, for compatibility with a fictitious driving profile that corresponds to the traffic situation existing according to traffic information that has been received. In the simplest case, for example, the average speed at a preestablished time or segment interval could be used as the characteristic property. The values of the lowest and highest speeds in an interval (threshold values) are another property that could be assessed.

This means, for example, that a vehicle travelling in a route segment where radio broadcasts have reported sluggish traffic assumes a relatively low speed as the expected value for the average speed. Thus, the actual speed of the vehicle should never be in a high range, and should be zero only for very brief time periods, at the most. Were the sensor system of the vehicle to determine a high speed over a certain time period or route segment, this would be evidence that the sluggish traffic had cleared up. Conversely, a longer stop by the vehicle could point to an accident. In both cases, the transmission of data to the traffic center would be useful. In contrast, if the expected average speed actually existed, data transmission would not be useful.

When the transmitted traffic situation information also includes travel times between two points, for example, as various proposals have suggested, the measured driving profile can be analyzed for the actual travel time. It is also possible to measure the length of traffic jams in this way, i.e., the measured driving profile can be analyzed to determine the route segment over which the otherwise usual speed is reduced. In addition, more complex descriptions, such as “stop and go,” “clear,” etc., can constitute driving profile properties in the sense of the invention.

The decisive step of the invention is the formation of expected values from received traffic information, and the transmission of a report as soon as the vehicle discovers (i.e., measures) a different situation than the one expected. Thus, the unique feature is that the vehicle now “knows” the traffic situation as pictured by the traffic center, and independently ascertains the correctness—or particularly, the incorrectness—of this picture. In contrast, DE 19 13 640 A1 assigns the vehicle the role of sending traffic data to the traffic center, and only the traffic center “knows” the traffic situation. The result is that vehicles function, for example, as “traffic jam detectors” and, upon entering a traffic jam, regularly report this event. This report is repeated by each new “floating car” to enter the traffic jam. However, by then, the traffic jam information is already known to the traffic center. The present invention prevents the transmission of such redundant information from the vehicle.

Current traffic information can, of course, also be transmitted to the vehicles other than by radio, e.g., by cellular mobile telephone under the GSM standard. Especially preferred is the transmission of information via a broadcast-capable radio network, particularly a paging network. It is also possible to create the expected values of the driving profile properties based not on currently received data, but rather on predicted traffic situation data. For this purpose, heuristic traffic situation data can also be used as a basis. In this case, it is especially advisable to modify and store the heuristic traffic situation data for a given route segment in the vehicle, based on the collected sensor data, in the manner of a self-learning system, so as to improve its informative value. At least the variables time of day, vehicle location and vehicle speed should be used as a basis to define the driving profile. With respect to the decision criteria used in a vehicle, it can be advantageous to predetermine these in a variable manner from the outside. Thus, it is especially advantageous when the traffic center that is to receive the data can transmit such decision criteria to vehicles (e.g., in a certain area) by means of wireless communications, so that necessary changes can be made immediately, without individual vehicles having to stop at a workplace, for example, for such updates. Thus, in view of the decision process, it should be possible to prescribe parameters for the user device in the vehicle; that is, the comparison criteria and the sensitivity of the decision process should be predeterminable by the traffic center.

DETAILED DESCRIPTION OF THE PREFERRED EMBODIMENTS

Figure 1:
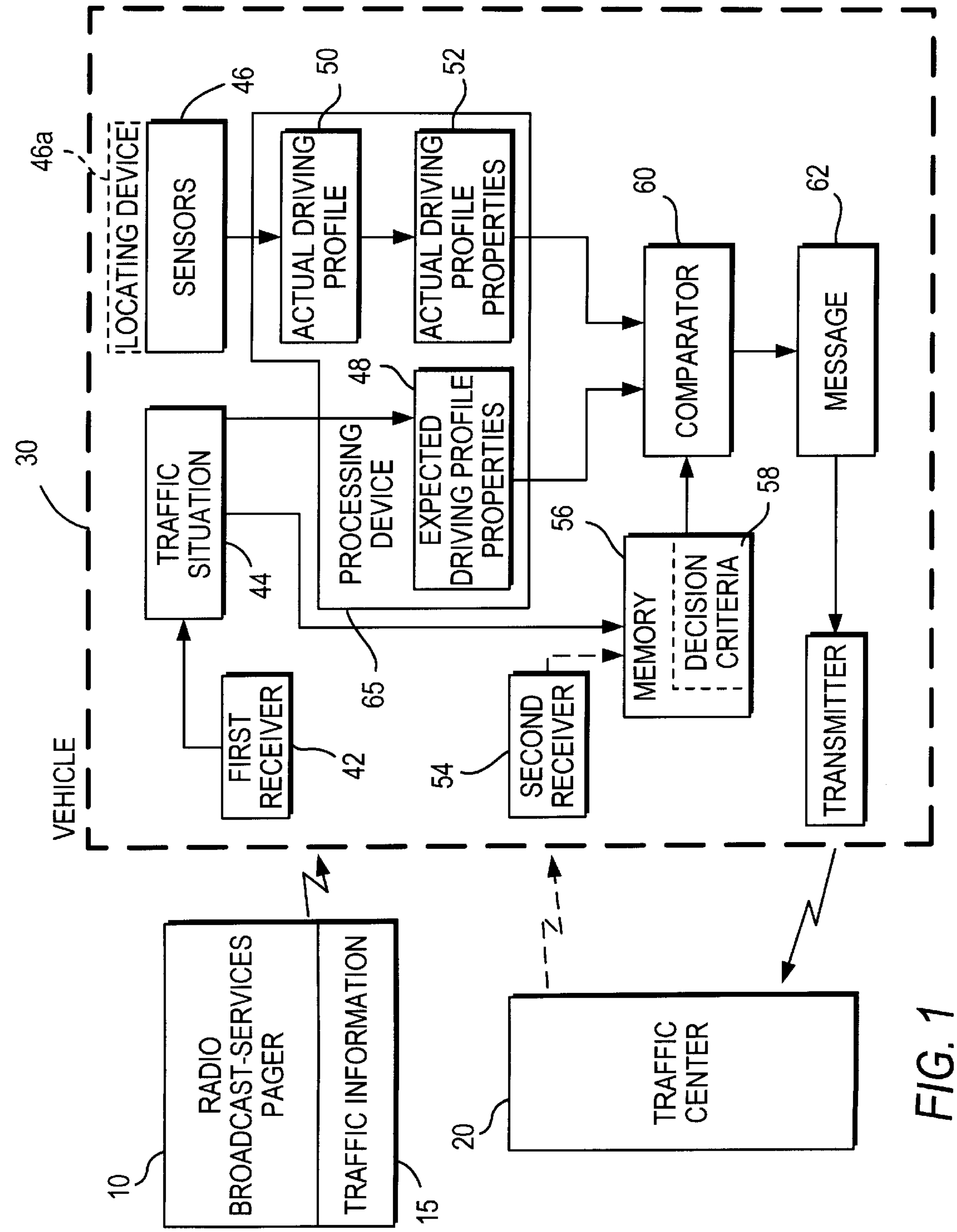
FIG. 1 is a block diagram showing a device for wireless transmission of data for traffic system assessment in segments of a road network to a traffic center according to an embodiment of the present invention.

In FIG. 1, the functionalities occurring in a vehicle 30 and the devices located in the vehicle 30 are surrounded by a dashed line. These devices located in the vehicle together make a device for transmitting data on traffic assessment according to the present invention. Via a first receiver 42, the vehicle 30 can wirelessly receive traffic information 15 that is broadcast, for example, via radio, broadcast service 10 or pager service. Preferably, the traffic information 15 is transmitted in coded form. For this purpose, various processes can be used, such, for example, as ALERT-C. The origin of the traffic information 15, (whether this information is broadcast by a radio station or by a traffic center collecting traffic data) is not of primary importance. The traffic information relevant to a segment just travelled by a vehicle forms a “traffic situation 44”. Predetermined conversion algorithms are used to derive from this information characteristic driving profile properties in the form of expected driving profile properties. In a simple form, the creation of characteristic driving profile properties may, for example, include establishing a threshold value for speed. However, highly complex assumptions about typical driving profiles can also be made. In the framework of the invention, it can be useful for the conversion algorithms to be preestablished by a traffic center 20 via wireless communication, so as to ensure uniform conversion in all “floating cars.” Further, a series of sensors 46, which can detect driving-relevant measurement data, are located in the vehicle 30. As a rule, these data include, along with the time of day, in particular, the speed and current position of the vehicle 30. Preferably, the sensors 46 include a locating device 46*a* operating on the basis of satellite navigation to determine the vehicle location. This locating device 46*a* may be a direct component of the device provided to implement the invention, or the device to implement the invention may be connected to such a locating device 46*a*. From the current actual driving profile 50, which is formed via the chronological sequence of data from sensors 46, the device according to the invention derives 52. A processing device 65 may include an integral circuit for determining the expected driving profile properties 48 and the actual driving profile properties 52; actual driving profile properties. The device further comprises a comparator 60, in which the actual driving profile properties 52 are compared with the expected driving profile properties 48. To assess the results of this comparison, suitable decision criteria 58 are supplied to the comparator 60 from a memory 56. Depending on whether the comparison by the comparator 60 leads to the conclusion that a serious deviation from the expected traffic situation does (or does not) exist, a report is (or is not) sent to the traffic center via a transmitter 64 belonging to the device according to the invention. In the example, the device according to the invention also has a second receiver 54, which can receive modified decision criteria transmitted from the traffic center to the memory of the vehicle. Of course, it is also possible for the first receiver 42 for traffic information and the second receiver 54 for decision criteria to be physically one and the same receiver.

As mentioned above, it is not absolutely necessary to supply the vehicle with current traffic information to arrive at the expected driving profile properties 48. For this purpose, for example, heuristic information could be stored in the vehicle 30 in static form. Such heuristic systems can be presented in the form of load curves or similar methods familiar to the expert, for example. An expected profile dependent on the time of day can then be derived. In principle, it is also possible, for the purpose of refining the informative value, to modify or update the heuristic information by maintenance from the outside (preferably from the traffic center). Reference has already been made to the possibility of independent updating in the sense of a self-learning system.

In specific technical terms, the device according to the invention and the process according to the invention can be embodied in the vehicle in many different ways. For example, a device for vehicle navigation can be provided in the vehicle, which navigation device, via a satellite-supported locating device and a digital road map stored, for example, on CD-ROM and/or in memory 56 can exactly determine the current location of the vehicle 30 and associate it with a certain segment of the road network. As a result, the device according to the invention would know, for example, that the vehicle is currently located "on Autobahn A3 between interchanges X and Y." If the device according to the invention receives traffic information with the contents "traffic jam on A3 between interchanges X and Y, 6 km in length," this information can be converted into a corresponding driving profile with characteristic properties. In this case, the vehicle will expect a typical stop-and-go traffic profile. If the relevant road segment on the A3 between interchanges X and Y has unexpectedly become clear, the actual vehicle speed should be higher and more uniform than the expected values. The comparator 60 recognizes these deviations and can determine, based on the decision criteria, that the data of the actual driving profile should advantageously be transmitted to the traffic center 20, because the actual deviations are impermissibly high. In this relatively simple way, it is possible to limit the scope of the data transmitted by a fleet of "floating cars" for traffic situation assessment to a traffic center to a relatively low level.

What is claimed is:

1. A process for wireless transmission of data for traffic system assessment in segments of a road network to a traffic center, comprising the steps of:

collecting data using sensors in a floating vehicle in the road network;

forming a current driving profile from the data;

deriving actual values of characteristic driving profile properties from the current driving profile;

forming expected values of characteristic driving profile properties based on preestablished traffic situation information;

comparing the actual values to the expected values;

assessing a difference found in said step of comparing and determining whether the difference is a serious deviation from the expected values based on preestablished decision criteria; and transmitting the actual values to the traffic center if it is determined that the difference is a serious deviation in said step of determining.

2. The process of claim 1, wherein said step of forming expected values comprises forming expected values based on traffic information received via wireless communication.

3. The process of claim 1, wherein said step of forming expected values comprises forming expected values based on predicted traffic situation data.

4. The process of claim 1, wherein said step of forming expected values comprises forming expected values based on heuristic traffic situation data.

5. The process of claim 4, further comprising the steps of modifiying and storing the heuristic traffic situation data based on the data collected by the sensors of the floating vehicle via a self-learning system.

6. The process of claim 1, wherein said step of forming a current driving profile comprises forming a current driving profile including time, location and speed of the floating vehicle.

7. The process of claim 2, further comprising the step of receiving the traffic information via a cellular mobile telephone network.

8. The process of claim 2, further comprising the step of receiving the traffic information via a broadcast-capable radio network.

9. The process of claim 1, further comprising the step of changing the preestablished decision criteria as required by the traffic center via a wireless communication.

10. A device for wireless transmission of data for traffic system assessment in segments of a road network to a traffic center, including:

a sensor system mounted in a floating vehicle for determining driving profile data;

a processing device for receiving the driving profile data from said sensor system and determining actual values and expected values of characteristic driving profile properties;

a comparator for comparing the actual values and expected values of the characteristic driving profile properties and determining a difference between said actual values and said expected values;

a first memory comprising decision criteria; and a transmitting device for transmitting said driving profile data to the traffic center when said difference between said actual values and said expected values is determined to be a serious deviation from said expected values based on said decision criteria in said first memory.

11. The device of claim 10, further comprising a first receiver for receiving current traffic information from an external source and inputting said current traffic information to the said processing device for use in determining said expected values of characteristic driving profile properties.

12. The device of claim 11, wherein said first receiver comprises a device for operation in a cellular mobile telephone network.

13. The device of claim 11, wherein said first receiver comprises a device for operation in a broadcast-capable radio network.

14. The device of claim 10, further comprising a second receiver for receiving said decision criteria from the traffic center and transmitting said decision criteria to said memory.

15. The device of claim 10, further comprising a second memory including a digital roadmap.

16. The device of claim 15, further comprising a memory device, wherein said first memory and said second memory comprise portions of said memory drive.

17. The device of claim 10, wherein said sensor system further comprises a location device for determining a location of the floating vehicle.

18. The device of claim 17, wherein said location device comprises a device operable on the basis of satellite navigation.

* * * * *